United States Patent [19]

Coch

[11] 3,888,471
[45] June 10, 1975

[54] APPARATUS FOR THERMALLY TRANSFORMING METAL PARTS

[75] Inventor: Lester Coch, Northport, N.Y.

[73] Assignee: Waldes Kohinoor, Inc., Long Island City, N.Y.

[22] Filed: Apr. 5, 1973

[21] Appl. No.: 348,091

Related U.S. Application Data

[62] Division of Ser. No. 105,932, Jan. 12, 1971, Pat. No. 3,756,871.

[52] U.S. Cl. .................................. 266/4 A; 266/4 R
[51] Int. Cl. ................................................. C21d 1/46
[58] Field of Search ................... 148/131, 153, 155; 266/4 A, 4 R; 198/41

[56] References Cited
UNITED STATES PATENTS

| | | | |
|---|---|---|---|
| 1,053,209 | 2/1913 | Neumann | 198/41 |
| 1,071,847 | 9/1913 | Wilson | 198/41 |
| 1,183,809 | 5/1916 | Frisbee et al. | 148/131 |
| 1,895,998 | 1/1933 | Knerr | 148/153 |
| 2,322,777 | 6/1943 | Purnell | 266/4 R |
| 2,697,596 | 12/1954 | Troglione | 266/4 R |
| 3,340,109 | 9/1967 | Keough | 148/153 |
| 3,650,853 | 3/1972 | Keough | 148/153 X |

*Primary Examiner*—Roy Lake
*Assistant Examiner*—Paul A. Bell
*Attorney, Agent, or Firm*—Burns, Doane, Swecker & Mathis

[57] ABSTRACT

A process and an apparatus for thermally transforming metal elements wherein magnetic forces are employed to enhance reproducible positioning of the elements on a conveyor in a quenching bath as well as to enhance reliable removal of the elements from the bath. The apparatus includes a controlled rate conveyor having a first end positioned within a cooling and isothermal transformation reservoir and a second end extending to a position exteriorly of the reservoir. The first end of the conveyor serves as a loading station and the second end functions as an unloading station. A vertically adjustable chute extends within the reservoir adjacent the loading station for guiding parts onto the conveyor. A bank of magnetic flux producing members are positioned within the cooling reservoir adjacent the loading station for assisting in the location of metal elements upon the conveyor. A magnetic flux producing assembly is positioned at the unloading station for reliably removing transformed elements from the conveyor.

The process includes the steps of guiding elements to be transformed into a cooling and isothermal transformation reservoir and magnetically attracting them onto a conveyor within the reservoir. The elements are then carried on the conveyor through the reservoir at a controlled rate whereupon isothermal transformation takes place. The transformed elements are then magnetically removed from the conveyor for further processing, storage or use.

19 Claims, 4 Drawing Figures

APPARATUS FOR THERMALLY TRANSFORMING METAL PARTS

This is a division of application Ser. No. 105,932, filed Jan. 12, 1971, now U.S. Pat. No. 3,756,871 issued Sept. 4, 1973.

BACKGROUND OF THE INVENTION

This invention relates to a process and apparatus for thermally transforming metal elements. More specifically, the invention relates to a process and apparatus for thermally transforming steel parts, through quenching, from an annealed state to a harder stable state such as for example bainite.

Annealed metal, at stable temperatures, is soft and ductile and therefore well suited to fabrication processes. Consequently, most steel forging and rolling operations are performed on steels in the annealed state. Following physical transformation of an annealed member, however it is often desirable to harden the steel into bainite in order to enchance the wear properties of the finished part.

The production of bainite has been developed into a commercial process known as austempering. Austempering or isothermal heat treatment of steel begins by raising the equilibrium temperature of the steel above the iron-carbon alloy eutectoid temperature of 1,333°F. At this temperature, the steel will transform into austenite. The steel is then rapidly cooled or quenched to a temperature slightly above the martensite transformation temperature which for normal steels is typically about 500°F. The next step is isothermally maintain the steel at the new lower thermal equilibrium for a sufficient period of time to completely transform the austenite into bainite microstructure.

In practicing the process of austempering, one convenient technique is to convey steel parts through a treating furnace set at an appropriate elevated temperature. The parts in the austenitic state are discharged through a fixed vertical guide chute onto a conveyor positioned within a quenching fluid reservoir, or bath, maintained at a lower temperature. The conveyor is employed to carry the parts through the reservoir after which they are discharged into a receiving station. During this travel, the conveyor runs at a preselected rate chosen to hold this steel at the quench temperature for a sufficient period of time to effect transformation to bainite.

While the above described technique may prove acceptable in some respects, room for significant improvement remains, particularly by reason of the metallurgical requirement of the process mandating that the rate of "cooling" in the quench must exceed the rate of transformation from austenite to pearlite.

To obtain bainite while avoiding transformation of the austenite into relatively softer pearlite, it is necessary that the initial cooling phase from a temperature above 1,333°F. to slightly above 500°F. proceed rapidly enough to miss the "knee" of the temperature-transformation-time curve. However, rapid cooling may be achieved on a continuous basis only when the quenching bath is appropriately maintained at the chosen cooling temperature. Practically, to achieve the desired cooling, it is necessary to vigorously circulate or agitate the bath.

Violent agitation of the salt, however, may induce the steel parts to "swim" in the bath between the effective end of the discharge chute and the conveyor positioned within the reservoir. Such swimming often results in location of the parts at an advanced position of the conveyor belt. This phenomenon may be particularly acute by reason of the lightness and geometry of certain parts, bearing in mind that treatment of relatively small parts is common by reason of the need for the cooling rate to exceed the rate of transformation to pearlite. Resultant random advancement of parts to unintended conveyor locations culminates in a shorter holding time at quench temperature within the reservoir.

It will therefore be apparent that the frequent limitation of the technique to treatment of relatively small elements (intended to insure cooling of both the sub-surface and surface of the elements so as to avoid transformation of the interior of the elements into pearlite) may hamper the reliability of obtaining complete transformation of all parts to bainite by reason of the swimming phenomenon. Moreover, the swimming phenomenon may even result in loss of parts to the quenching reservoir.

Because of these undesirable side effects of violent bath agitation, particularly with small parts, agitation is sometimes reduced or even temporarily discontinued. Reduced agitation, however, precipitates less reliable cooling and undesirably non-uniform bath temperatures. As a result, undesirably wide variations in the heat treated part properties, i.e., microstructure of the heat treated parts, may occur.

Further, in practice, the steel parts may not be uniformly distributed from side-to-side on the conveyor following discharge through the chute from the austenizing furance. Side-to-side part maldistribution on the conveyor can result in uneven part cooling and unreliable transformation to bainite. As will be appreciated such undesirable bias or random maldistribution may be heightened by agitation of the quenching bath.

It would, therefore, be highly desirable to provide a process and apparatus to insure predictable part movement in a quenching reservoir by controlling the transfer of the part from a chute between an austenizing furnace and a conveyor positioned within the quenching reservoir. Further, it would be desirable to assist in the accurate and reliable placement of the parts on the conveyor at uniform intervals with uniform side-to-side spacing. Additionally, it would be desirable to provide for retention of the advantages of quenching agitation while minimizing the problems associated with swimming or maldistribution of the treated parts.

At the conclusion of the holding time in a quenching bath such as a fused salt reservoir, the conveyor is utilized to discharge the transformed parts into a wash bath. Combinations of gravity, air blasts, heat to maintain the salt in a liquid form, and impact have been typically employed in the unloading process. However, the viscous nature of the fused salt may tend to make unloading of the conveyor difficult and unreliable. Very small parts present almost insurmountble unloading problems with conventional techniques.

Parts which are often retained on the conveyor are carried back by the conveyor into the fused salt tank There, the parts may be deposited beneath the conveyor as debris. Eventually the deposited parts may accumulate to a sufficient depth to cause conveyor stoppage resulting in premature and expensive maintenance. At times, the "carried back" parts may be retained on the conveyor, and intermixed with parts being heat treated, when it again passes the discharge chute of the austenizing furnace. These disadvantages stemming from conventional unloading techniques may be compound where uneven side-to-side distribution of parts on the conveyor, as earlier discussed, is present.

It would, therefore, be highly desirable to provide a process and apparatus for reliably unloading parts from a conveyor following temperature transformation of the parts in a quenching reservoir.

OBJECTS AND SUMMARY OF THE INVENTION

It is therefore a general object of the invention to provide a novel process and apparatus designed to obviate or minimize problems of the type previously described.

It is another object of the invention to provide a novel process and apparatus which will minimize metallurgical microstructure variation of parts transformed in a thermal transformation process.

It is a particular object of the invention to provide a novel process and apparatus for minimizing the tendency of parts to swim between the end of a parts discharge chute from an austenizing furnace and the loading station of a conveyor positioned within a fused salt cooling reservoir, whereby reliable transformation may be enhanced.

It is a further object of the invention to provide a novel process and apparatus for assisting in the accurate and reliable distribution of parts on a conveyor positioned within a quenching reservoir communicating with the discharge zone of a guide chute.

A related object of the invention is to provide an adjustable guide at the discharge zone that may be regulated in accordance with the size of the parts being treated.

A further related object of the invention to provide such a process and apparatus wherein uniform distribution of parts from side-to-side on the conveyor may be obtained.

It is yet a further object of the invention to provide a novel technique for transporting parts to be transformed in a quenching reservoir which will minimize the tendency of the parts to depart from their intended transportation route notwithstanding a violently agitated condition of the quenching bath.

It is another object of the invention to provide a novel process and apparatus for reliably removing parts from a conveyor, following the heat transformation thereof in a reservoir, by minimizing parts carryback, loss and conveyor stoppages.

It is still another object of the invention to provide a parts chute and conveyor composed of material which will not interfere with the accurate and continued effectiveness of either the process and apparatus for magnetically assisting in the placement of and distribution of parts onto a conveyor within a quenching reservoir or the removal of parts from the conveyor following isothermal temperature transformation within the reservoir.

A process and apparatus for achieving at least some of the above enumerated objects includes a parts control system comprising a conveyor for advancing the parts at a controlled rate during an isothermal transormation process. The conveyor is positioned in a quenching bath and has a first loading end for receiving parts to be transformed and a second unloading end for discharging transformed parts for further processing, storage or use. A chute is positioned adjacent the loading end of the conveyor for guiding the parts to be transformed from an austenizing furance onto the conveyor. The chute may be adjustable to accommodate a variety of parts sizes.

A magnetic flux producing mechanism is positioned adjacent the loading end of the conveyor and serves to assist in the location of parts upon the conveyor thereby resisting any tendency of the parts to swim. A magnetic flux producing mechanism is also positioned adjacent the unloading end of the conveyor for reliably removing transformed parts from the conveyor so as to avoid carry back of the parts into the quenching bath.

The magnetic attraction of the parts at the loading station of the conveyor may advantageously be employed to achieve uniform distribution of the parts on the conveyor. Moreover, the efficiency of the magnetic attraction according to the present technique may be enhanced by the use of non-magnetic guiding conveying elements permitting magnetic control of the steel parts without impairing future control by reason of residual magnetism.

THE DRAWINGS

Further objects and advantages of the present invention will become apparent from the following detailed description of a preferred form thereof taken in conjunction with the accompanying drawings wherein.

DETAILED DESCRIPTION

General Structure

Figure 1:
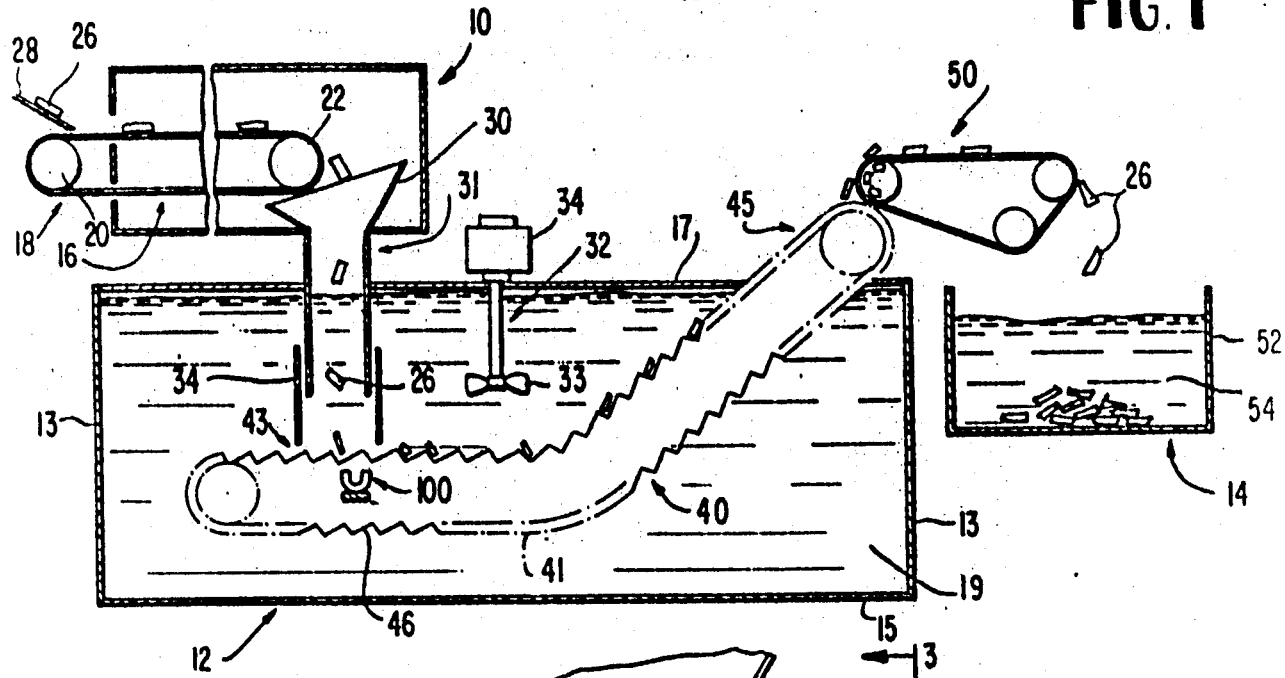
FIG. 1 is a schematic side elevational view of a heat transformation system including a heating furnance or chamber, a cooling and isothermal transformation reservoir, and a washing bath, along with conveyor means for controlling the rate of movement of parts through the heat treating system.

Referring now to FIG. 1, there will be seen a schematic side-elevational view of a heat transformation system including a heating chamber 10, a cooling and isothermal transformation reservoir 12 and a washing bath 14.

The heating chamber 10 may be a generally enclosed thermally insulated structure having an opening in one side thereof, as indicated at 16, for the accommodation of the loading end of a parts conveyor 18. The conveyor 18 may be driven at the loading end by a driving sprocket 20 positioned exteriorly of the chamber 10. The other or unloading end may cooperate with an idler sprocket 22 within the interior of the chamber 10. The parts 26, such as small steel forgings and the like, may be delivered to the loading end of the conveyor 18 by means of an inclined ramp 28 or other conventional conveyor means. The illustrated driving sprocket 20 is designed to advance the upper run of the conveyor from left to right, viewed in FIG. 1, and parts 28 are thus carried into the heating chamber 10.

It will, however, be appreciated that any suitable conveying technique may be employed. For example, the conveyor 18 may be a mesh-belt endless conveyor, a shaker hearth conveyor, a rotary conveyor, or any other commonly used through-put furance conveyor.

The temperature of the chamber 10 may be maintained at an appropriate temperature generally above the austenite eutectoid temperature of 1,333°F. by a conventional energy source (not shown). It will be appreciated that the parts 28 are raised to the equilibrium temperature of the chamber 10 while being continuously transported on the conveyor 18 therethrough. By the time the parts 26 have reached the idler sprocket 22 an appropriate equilibrium temperature is achieved and the microstructure of the parts 26 has been transformed into austenite.

Upon reaching the unloading end of the conveyor 18, the parts are delivered by gravity into the mouth 30 of an unloading guide chute means 31. This guide chute means 31 is employed to direct the parts into a quenching and isothermal transformation reservoir 12.

The reservoir 12 may be a generally enclosed thermally insulated structure having side walls 13, a bottom wall 15 and a top cover 17. The reservoir 12 is filled with a suitable quenching medium 19, such as molten lead or fused salt solution. Maintenance of the medium 19 at an appropriate temperature, typically slightly above 500°F., may be attained by conventional heating units (not shown) strategically located with respect to the reservoir. The maintenance of the quenching medium or bath 19 at a desirable temperature may be aided by vigorous agitation of the bath with agitation means such as one or more dispersion units 32, provided with an impeller 33 driven by a conventional drive motor 34.

It will, however, be apparent that other agitation means may be employed. For example, a conventional hydro-static head overflow tube principle or direct pump agitation may be utilized.

While only one agitation means is graphically depicted in FIG. 1, it will be appreciated by those skilled in the art that a number of such devices may be appropriately located throughout the reservoir in order to minimize thermal gradients and to thus maintain the bath at a reasonably acurate uniform temperature. Preferably, at least one agitation means such as the dispersion unit or circulation means 32 (e.g., the one illustrated) is positioned in a zone closely adjacent the guide chute 31 so as to tend to maintain the bath temperature uniform at the initial zone of quenching contact of the parts with the medium 19.

The guide chute 31 is provided at its lower end with a telescopically adjustable extension sheath 34 which will be described more fully hereinafter.

A conveyor system 40 is positioned so as to be primarily submerged within the reservoir bath 19. The conveyor system includes a conveyor 41 having a first section forming a parts loading station 43 within the reservoir 12. This first section may be generally horizontally disposed as illustrated. A second conveyor system section extending exteriorly of the reservoir 12 functions as a parts unloading station 45. As illustrated, this second section may be disposed in an inclined posture.

In order to assist in the desired positioning of parts 26 upon the endless conveyor 41 at the loading station 43, a magnetic parts placement unit 100 is positioned beneath the upper conveyor run to attract parts 26 onto the conveyor. The parts are then transported from left to right as viewed in FIG. 1 through the fused salt or other quenching medium 19, and the parts are isothermally transformed from an unstable austenite to bainite.

Following transformation, the parts are delivered out of the reservoir 12 to the parts unloading station 45. There are parts come under the influence of a juxtapositioned magnetic flux producing pick up and transfer system 50. The transformed parts 26 are then supplied to the washing or cooling bath 14 as illustrated.

This bath may comprise a suitable tank 52 filled with water or oil 54. The parts may be permitted to accumulate in the tank 52 until they are subsequently removed for further processing, storage or used as desired.

Parts Loading Mechanism

Figure 2:
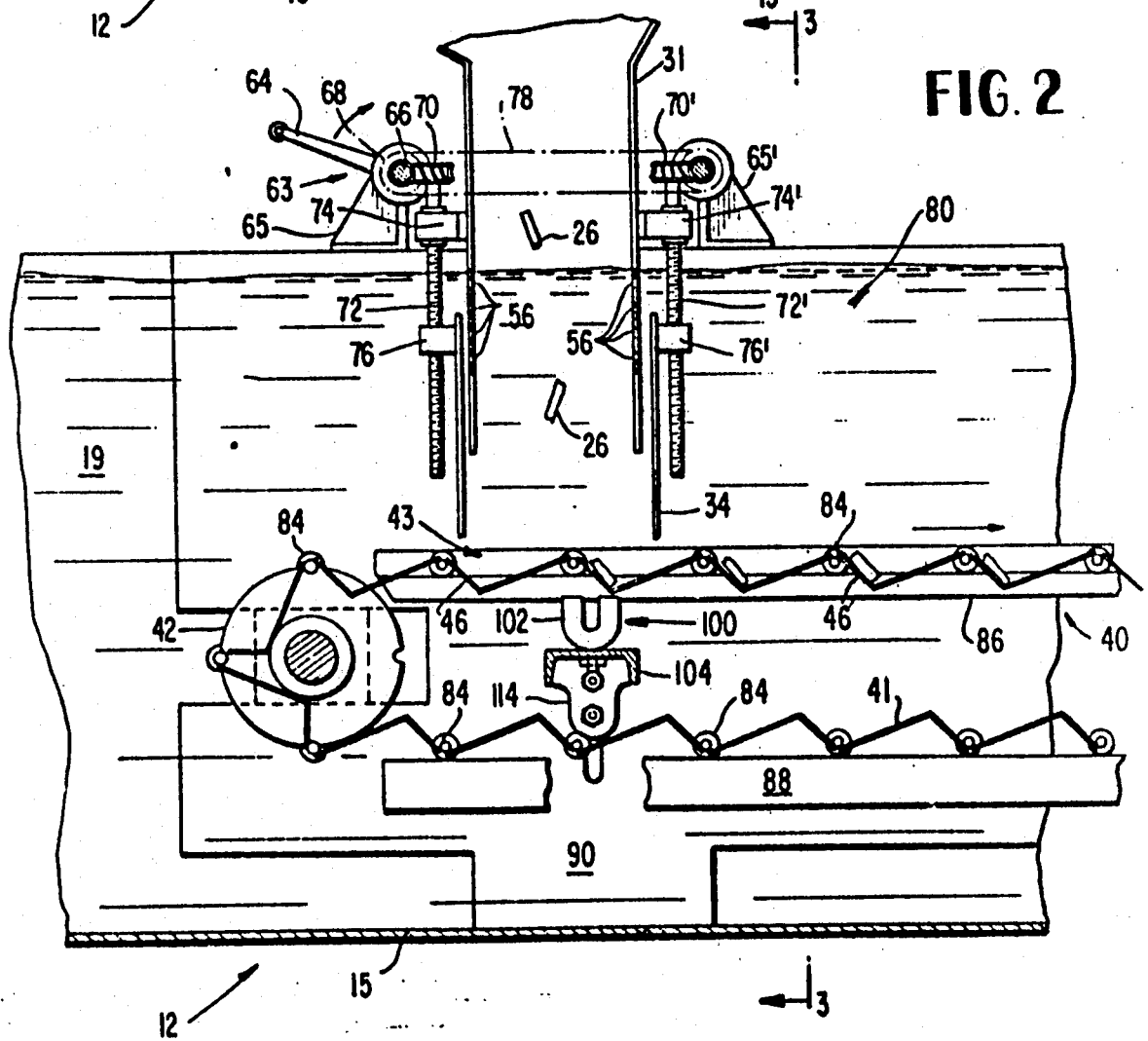
FIG. 2 is a partial side elevational, detail view within the isothermal cooling reservoir illustrating a telescopically adjustable end of a parts guide chute, a loading station of a controlled rate conveyor and a magnetic flux producing mechanism positioned beneath the upper run of the conveyor.
Figure 3:
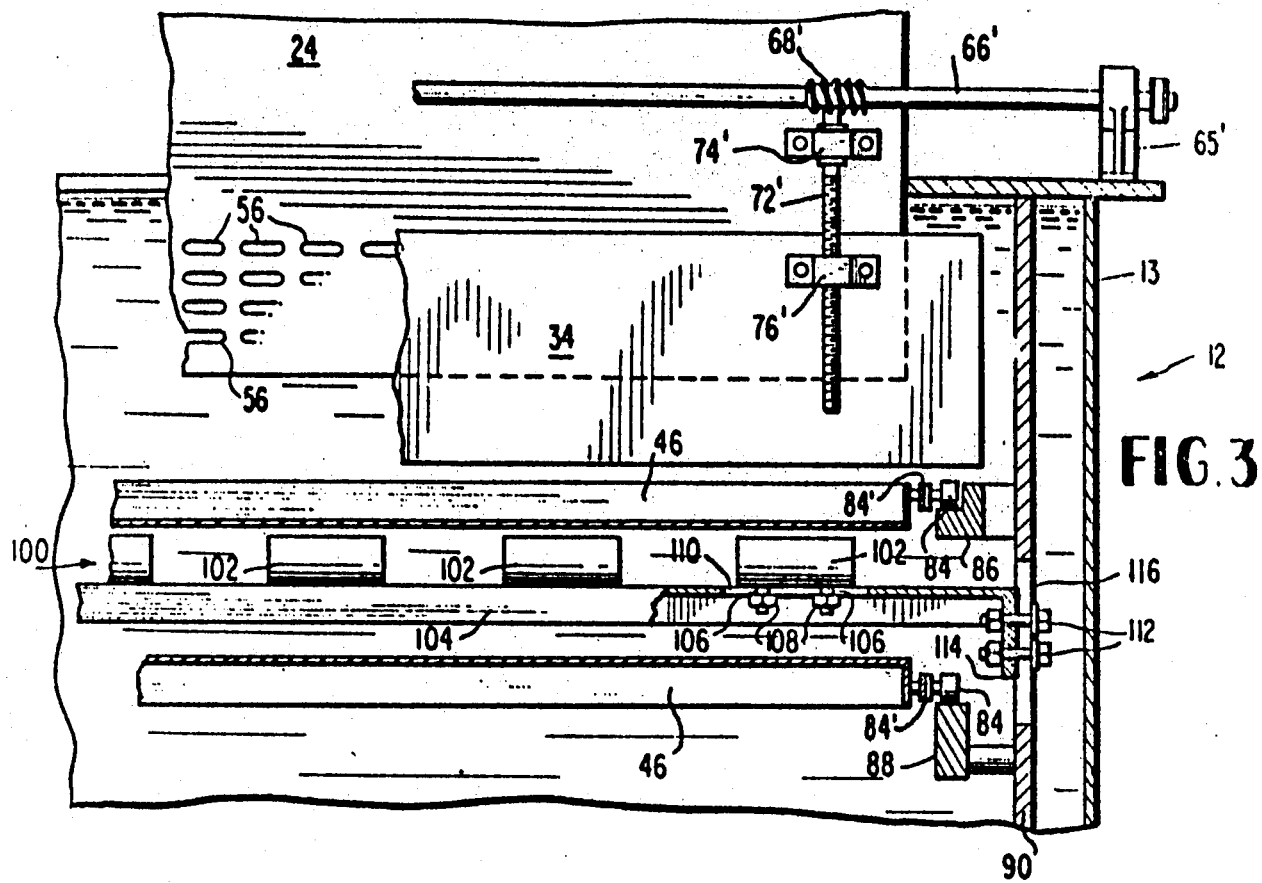
FIG. 3 is a partial cross-sectional view taken along section line 3—3 of FIG. 2.

Referring now to FIG. 2 and 3, there will be seen a detailed view of structure which may be employed to load the parts 26 on the conveyor 41 positioned within the interior of the fused salt reservoir 12.

As earlier noted, the parts guide chute 31 is augmented at its lower end with the telescopically adjustable sheath extension 34 located in the quenching medium 19. This extension 34 permits an operator to minimize the free height between the effective end of the guide chute 31 (i.e., the bottom of the extension 34) and the parts loading station 43 of conveyor 41. Thus, the zone confining the parts 26 as they descend by gravity toward the conveyor 41 is controllable. When larger steel parts 26 requiring a greater clearance are heat treated, the sheath extension can be raised accordingly. If desired, a plurality of apertures 56 may be fashioned through the lateral sides of chute 31 (and/or the extension 34) to enable the quenching medium to freely circulate through the chute. Temperature uniformity between the interior and the exterior of the guide chute 31 may be thereby enhanced.

The adjustable character of the chute extension 34 may be provided by a suitable control mechanism designated at 63. The illustrated control 63 positioned on the left side of sheath 34, as viewed in FIG. 2, may include a hand crank 64 suitably journalled through an upright bracket 65 fixed upon the top 17 of the cooling reservoir 12. This crank 64 may be connected to a horizontally extending shaft 66 having one or more worm gears 68 fashioned thereupon for mating engagement with one or more corresponding spur gears 70. The spur gears 70, in turn, may be connected to normally extending shafts 72 which may be journaled in bearing mounts 74 fixedly attached to the exterior of guide chute 31. The shafts 72 may be externally threaded on the lower ends thereof to mate with internally threaded mounts 76 fixedly connected to the exterior of the chute extension 34.

A chain or other suitable connective means may be used to couple the hand crank 64 of the control mechanism 63 to an otherwise substantially identical adjusting assembly 80 positioned on the opposite side of the guide chute 31. This latter assembly 80 may include a generally horizontal shaft 66' mounted at its ends within upright brackets 65'. The shaft 66' may also be provided with one or more worn gears 68' to mate with spur gears 70'. The spur gears 70' may be connected to normally extending and partially threaded shafts 72' received within bearing mounts 74' internally threaded mounts 76'.

Actuation of hand crank 64 may thus serve to rotate the worm gears 68 and 68' which drive spur gears 70 and 70' to rotate threaded shafts 72 and 72'. Such shaft rotation will be operative to advance or retract the threaded mounts 76 and 76' along the shaft threads to vertically adjust the sheath 34. It will, of course, be appreciated that any suitable means for adjusting the chute extension or sheath 34 may be provided.

The conveyor 41 of the conveyor system 40 for receiving parts passing from the chute 31 may be articulated. The articulated conveyor 41 is provided with bucket flights 46. The flights 46 may be mounted at the edges thereof upon bearing rollers 84 for generally free rotation with respect thereto. Suitable shaft connection 84' (see FIG. 3) may be employed for this purpose. The rollers 84 may ride upon a set of laterally spaced, parallel upper rails 86, and a set of laterally spaced, parallel lower rails 88. These rails 86 and 88 may be mounted within the cooling reservoir 12 upon a pair of spaced upright stanchions 90 supported upon the base 15 of the reservoir 12.

Adjacent the parts loading station 43, the endless conveyor 41 may be guided around an idler sprocket 42. This idler sprocket 42 is adjustably mounted, by conventinal means, also between the upright stanchions 90.

Further positioned between the stanchions 90 is the earlier noted adjustable magnetic parts placement unit 100. This placement unit 100 comprises a plurality or bank of adjustable magnetic flux producing members 102 positioned directly beneath the open end of the chute extension 34 and beneath the loading station 43 of the conveyor 41.

The individual magnetic flux producing members 102 may, for example, be permanent magnets (as shown) or electromagnets as desired. Each member 102 may be mounted upon a horizontally extending bracket 104. The bracket 104 may be provided with a plurality of spaced slots 110. Studs 106 connected to the individual members 102 and extending through the slots 106 may be secured by threaded fasteners 108.

Each slot 110 may be dimensioned to permit lateral movement of the members 102 before the fasteners 108 are tightened. Therefore, the members 102 may be laterally adjusted across the width of the conveyor 41 to enhance side-to-side dispersion of parts 26 being loaded thereupon. In this connection, it will be appreciated that a part randomly descending toward one side of the conveyor will be attracted by the magnetic flux and continue toward that side of the conveyor notwithstanding existence of a current of the medium 19.

The horizontal bracket 104 carrying the members 102 may be, if desired, vertically adjustably mounted between the upright stanchions 90 by conventional threaded fastener connectors 112. These fasteners 112 may be received through a downwardly extending arm 114 on each end of the bracket 104, and through slots 116 fashioned into the upright stanchions 90. Such vertical asjustability may permit adjustment of the strength of the magnetic flux encountered by the parts descending toward the conveyor 41 to insure the proper attractive effect to further minimize the tendency of parts to swim within the fused salt. Individual vertical adjustability of the members 102 may also be provided.

Thus, it will be seen that parts 26 to be isothermally transformed within the cooling reservoir 12 fall by gravity through guide chute 31 onto the conveyor 41. The tendency of the parts to swim off the conveyor or to unintended locations on the conveyor is minimized by the magnetic attraction of the parts to the conveyor, and may be further controlled by adjustment of the sheath extension 34 to a position adjacent the upper run of conveyor 41. The parts descend into bucket flights 46 of the conveyor 41 with the assistance of magnetic flux producing members 102 positioned directly beneath the loading station 43 of the conveyor 41. Horizontal placement of the plurality of individual members 12 assists in evenly distributing parts from side-to-side on the conveyor 41.

During transportation the flight cups may serve to protect the parts from excessive currents otherwise tending to displace the parts from the conveyor during movement through the reservoir. The conveyor, loaded with parts to be isothermally transformed, advances the parts at a controlled rate through the fused salt bath whereupon isothermal metallurgical transformation takes place.

In order to minimize the tendency of the guide chute 31, sheath extension 34 or conveyor 41 from becoming magnetized and thus interfering with further magnetic control of parts in subsequent operations, these elements are preferably constructed of magnetically inert materials such as, for example, stainless steel.

Unloading Mechanism

Figure 4:
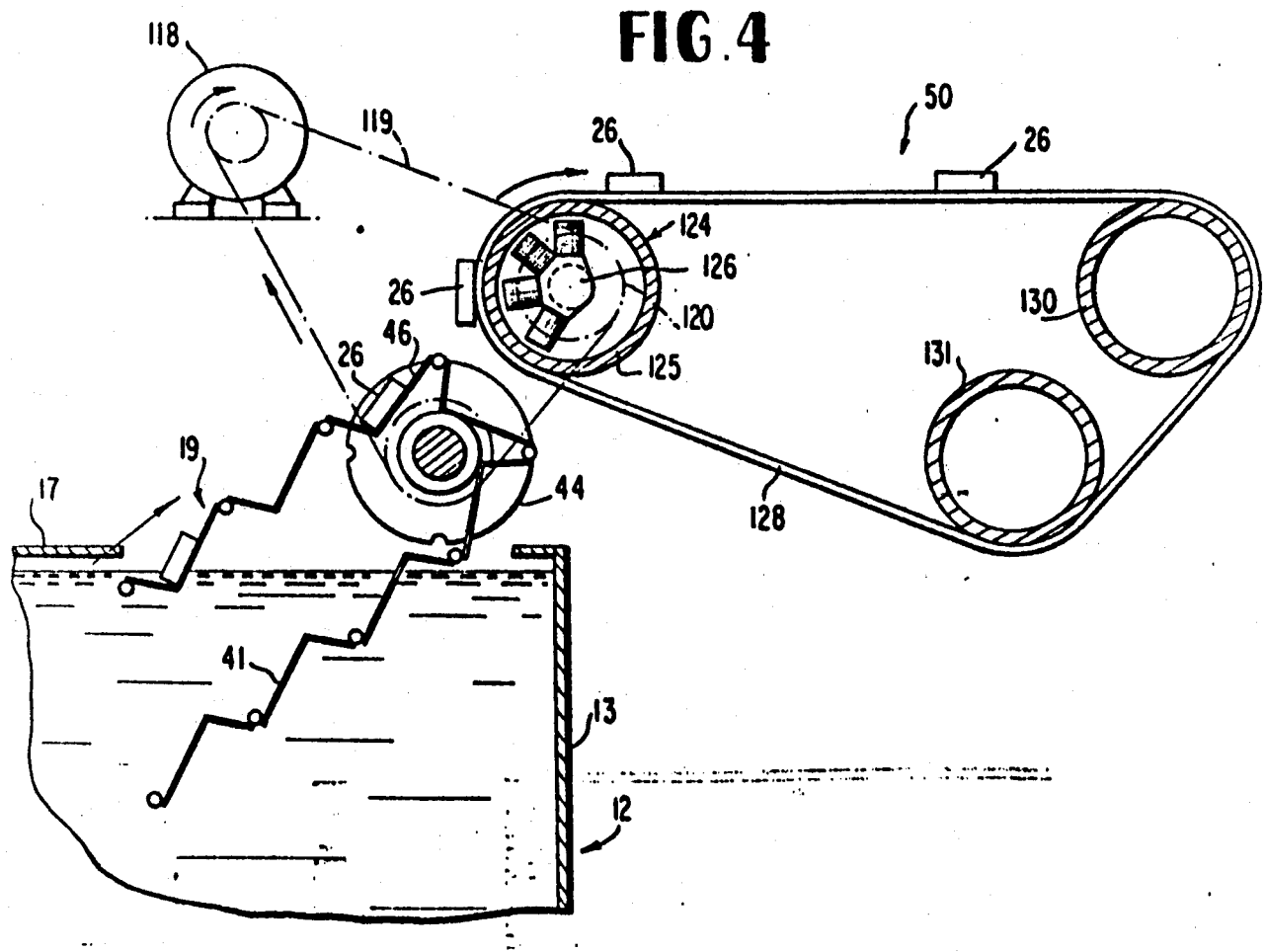
FIG. 4 is a partial, side elevational, detail view of an unloading station of the conveyor and a magnetic flux producing mechanism for unloading the conveyor as schematically illustrated in FIG. 1.

After transportation to the parts unloading station 45, the parts are transferred to the wash bath 14. As best viewed in FIG. 4, to facilitate transfer, the cooling reservoir 12 has an opening 19' in the top wall 17 thereof. The conveyor 41 exits through that opening 19' to a location surrounding a suitably mounted driving sprocket 44. This driving sprocket may be connected to a conventional power source 118 for driving the sprocket at a selected constant rate. The power source also may be suitably drivingly connected (e.g., by means of a belt or chain 119) to a driving pulley 120 of a magnetic pick-up drum assembly 124.

The magnetic pick-up drum 124 comprises the initial segment of the previously mentioned pick-up and delivery system 50. As previously discussed, it has often been extremely difficult to reliably unload small parts 26 from the conveyor 41 by reason of the carry back problem. This problem may be acute where the parts are covered with a somewhat viscous fused salt solution. It has been envisioned, however, that a magnetic flux producing member such as the magnetic pick-up drum assembly 124 reliably can be utilized to remove the parts 26 from the juxtaposed bucket flights 46 of the conveyor 41.

The pick-up drum 124 may include a cylindrical shell 125 pivoted at the ends thereof upon suitable supports (not shown). A bank of permanent or electromagnets 126 may be independently and stationarily mounted within the interior of the shell 125. These members 126 serve to create a magnetic flux which draws the parts 26 toward the pick-up drum assembly 124.

An endless belt conveyor 128 may be trained around the driven shell 125 and a pair of spools 130 and 131. As the belt 128 rotates, the magnetic flux is of sufficient strength to overcome the tendency of gravity to pull the parts 26 from the belt 128. The parts 26 are thus picked up and transferred, preferably horizontally as shown, from left to right upon the belt whereupon they fall by gravity into a washing bath 14 for further processing, storage or use.

It will be appreciated that the conveyor 128 and idler spools etc., may be non-magnetic to avoid parts control problems stemming from residual magnetism.

Operation

In summary, the technique of the present invention may be carried out by first heat treating the parts 26 to an austenitic state in the heating chamber 10. The controlled rate endless conveyor 16, or other suitable conveying means, delivers the parts in an austenitized equilibrium state to the mouth 30 of the vertical guide chute 31. The parts 26 drop into the quenching and isothermal transformation reservoir 12 which is filled with the quenching solution 19 held at an appropriately uniform temperature slightly above the martensite transformation temperature.

The parts 26 upon entering the quenching medium 19 immediately begin to cool and by the time the parts have reached the conveyor 41, they exhibit sufficient magnetic properties to enable a magnetic mechanism 100 to assist in the accurate and regular placement of the parts within the bucket flights 45 of the conveyor 41. The telescopically extensible sheath 34 may be contiguously positioned with the upper run of the conveyor 41 so that parts 26 may vertically descend by gravity toward the conveyor flights in guided fashion. In this fashion parts swimming and the attendant disadvantages are minimized or obviated. The magnetic mechanism 100 is provided with a plurality of magnetic flux producing members 102 which may be adjustable to optimize the side-to-side placement of parts 26 upon the conveyor flights 46. Further advantages may be realized by appropriately adjusting the location of those members. The parts 26 thus located within and appropriately distributed across the buckets of the conveyor are advanced through the quenching bath 19 at a controlled rate whereupon the unstable austenite is isothermally transformed below the knee of the temperature-transformation-time diagram to a hard bainite microstructure.

Following transformation, the parts are carried by the conveyor 41 to the exterior of the cooling reservoir 12. At the unloading station 45, the parts 26 are magnetically picked up by the drum assembly 124 and conveyed by belt 128 to a washing bath for further processing, storage or use.

It will be appreciated by those skilled in the art that the present invention provides a significant process and apparatus for minimizing the tendency of parts to swim in, even where the cooling bath is violently agitated by the mechanism 32, during reproducible placement of the parts upon a conveyor within the bath.

Further, the invention includes an advantageous process and apparatus for attracting the parts onto the conveyor buckets and assisting in the uniform distribution of the parts from side-to-side on the conveyor. This minimizes clustering of the parts on one portion of the conveyor to aid in the provision of heat transfer characteristics which are essential to reliable temperature transformation.

Additionally, the invention provides a process and apparatus for reliably removing transformed parts from the conveyor flights in a manner which reduces parts carry back, loss and conveyor stoppages.

It will be appreciated that while the invention has been described in connection with the treatment of parts such as steel forgings or the like, other parts may be treated according to the present invention so long as they exhibit such magnetic properties at the conveyor loading and unloading stations as to enable the attraction to and removal from the conveyor means at these locations.

Although the invention has been described with reference to a preferred embodiment, it will be appreciated by those skilled in the art that additions, deletions, modifications and substitutions and other changes not specifically described may be made which will fall with the purview of the appended claims.

What is claimed is:

1. A system for thermally transforming metal elements heat treated at an elevated temperature, the system comprising:
   a cooling and isothermal transformation reservoir including a quenching medium;
   conveyor means for transporting metal elements from a conveyor loading station positioned within said quenching medium to a conveyor unloading station positioned externally of said medium;
   guide means for guiding the metal elements heat treated at an elevated temperature from a location externally of said quenching medium toward said loading station of said conveyor means; and
   magnetic flux producing means, positioned within said quenching medium adjacent said loading station, for controlling the holding time of the metal elements at quench temperature within said quenching medium by magnetically attracting the guided metal elements onto said conveyor means at said loading station so as to assist in positioning of the metal elements on said conveyor means.

2. The system as defined in claim 1 wherein said magnetic flux producing means comprises:
   a bank of magnets adjustable with respect to said conveyor loading station.

3. The system as defined in claim 1 wherein:
   said guide means and said conveyor means are constructed of magnetically inert material.

4. The system according to claim 1 wherein said guide means comprises:
   a guide chute extending from a location externally of said quenching medium toward said conveyor loading station, and
   an adjustable chute extension surrounding the end of said guide chute adjacent said conveyor loading station.

5. The system according to claim 1 including:
   removal and conveying means for removing the metal elements from said conveyor and transporting the removed elements to a location remote from said conveyor unloading station,
   said removal and conveying means including further magnetic flux producing means positioned adjacent said conveyor unloading station.

6. The system according to claim 5 wherein said further magnetic flux producing means comprises:
   a rotatable magnetic drum assembly.

7. The system according to claim 1 wherein said conveyor means comprises:
an articulated bucket flight conveyor.

8. A system for thermally transforming steel elements, the system comprising:
a heat treating furnace for heating the steel elements to an elevated temperature to place the steel elements in an austenitic state;
a salt quenching bath;
articulated bucket flight conveyor means for transporting the steel elements from a conveyor loading station in said salt quenching bath to a conveyor unloading station externally of said salt quenching bath;
a guide chute extending from a location adjacent said heat treating furnace toward said conveyor loading station;
steel element positioning means located in said quenching bath adjacent said conveyor loading station for magnetically attracting steel elements passing through said guide chute onto said articulated bucket flight conveyor;
circulation means positioned adjacent said guide chute for agitating said quenching bath; and
steel element removal and transportation means, positioned adjacent said conveyor unloading station, for magnetically removing the steel elements from said conveyor means and transporting the removed steel elements to a remote station.

9. The system as defined in claim 8 wherein:
said steel element positioning means comprises a plurality of magnets, adjustable with respect to said conveyor loading station, for controlling the dispersion of the steel parts across said articulated bucket flight conveyor means.

10. The system as defined in claim 8 wherein:
said guide chute and said conveyor means are constructed of magnetically inert material.

11. The system as defined in claim 8 and including:
a guide chute extension surrounding the end of said guide chute adjacent said conveyor loading station and telescopingly adjustable with respect thereto.

12. The system according to claim 8 wherein said steel element removal and transportation means comprises:
a conveyor assembly including a rotatable magnetic drum assembly positioned adjacent said conveyor unloading station, and a non-magnetic conveyor belt means.

13. A system for thermally transforming metal elements heat treated at an elevated temperature, the system comprising:
a cooling and isothermal transformation reservoir including a liquid quenching medium;
conveyor means for transporting metal elements from a conveyor loading station positioned within said quenching medium to a conveyor unloading station positioned externally of said medium;
guide means for guiding the metal element heat treated at an elevated temperature from a location externally of said quenching medium toward said loading station of said conveyor means, said guide means comprising:
a guide chute extending from a location externally of said quenching medium toward said conveyor loading station, and
an adjustable chute extension surrounding the end of said guide chute adjacent said conveyor loading station; and
removal and transportation means, positioned adjacent said conveyor unloading station, and operable to impede carry-back of the metal elements into the liquid quenching medium by magnetically removing the metal elements from said conveyor means and transporting the removed elements to a remote station.

14. In an austempering system for thermally transforming steel elements from an annealed state to a harder stable state, wherein the system includes:
heat treating means for heating the steel elements to an elevated temperature to place elements in an austenitic state;
guide means for guiding the austenitic steel elements toward a loading station of conveyor means positioned in a liquid quenching medium; and
conveyor means for transporting the so positioned elements at a controlled rate through the quenching medium to a conveyor means unloading station, said controlled rate being selected in relation to a time period such that the steel elements are maintained at quench temperature for a sufficient time to effect transformation to bainite while avoiding transformation to pearlite;
the improvement comprising:
magnetic flux producing means positioned within said quenching medium for further controlling the holding time of the steel elements at quench temperature within the liquid quenching medium by magnetically attracting the guided steel elements onto the conveyor means at the loading station.

15. The improvement according to claim 14 in an austempering system for thermally transforming small, light steel elements from an annealed state to a harder stable state, including circulation means for agitating said quenching medium, said magnetic flux producing means being operable during such agitation to further control the holding time of the small, light steel elements at quench temperature within the quenching medium by said magnetic attraction onto the conveyor means at the loading station.

16. The improvement according to claim 15 wherein said magnetic flux producing means is operable to control the evenness of cooling of the steel elements by magnetic distribution of the steel parts across the conveyor means.

17. The improvement according to claim 16 in an austempering system having a salt bath quenching medium, including removal means for magnetically removing the steel elements from the conveyor means at the conveyor unloading station.

18. The improvement according to claim 14 wherein said magnetic flux producing means is operable to reproducibly control the evenness of cooling of the steel elements by magnet distribution of the steel parts across the conveyor means.

19. The improvement accordng to claim 14 in an austempering system having a salt bath quenching medium, including removal means for magnetically removing the steel elements from the conveyor means at the conveyor unloading station.

* * * * *